United States Patent [19]

Tache

[11] 4,337,457
[45] Jun. 29, 1982

[54] METHOD FOR THE SERIAL TRANSMISSION OF BINARY DATA AND DEVICES FOR ITS IMPLEMENTATION

[75] Inventor: Jean-Paul Tache, Lieu dit Moncey Saint-Laurent d'Agny, France

[73] Assignee: Compagnie Lyonnaise de Transmissions Optiques, Clichy, France

[21] Appl. No.: 114,013

[22] Filed: Jan. 21, 1980

[30] Foreign Application Priority Data

Jan. 30, 1979 [FR] France .................................. 79 02262

[51] Int. Cl.$^3$ ............................................. H03K 13/24
[52] U.S. Cl. .................... 340/347 DD; 375/4; 455/608; 371/56
[58] Field of Search .................. 340/347 DD; 375/17, 375/18, 3, 4; 455/608; 371/56

[56] References Cited

FOREIGN PATENT DOCUMENTS 1603165 4/1971 France .

OTHER PUBLICATIONS

Auffret, "Deuxieme Colloque Europeen sur les Transmissions par Optique", Sep. 1976, pp. 343–349.

Camborde, "Cables et Transmissions", vol. 32, No. 2, Apr. 1978, pp. 278–337.
Prigent, "Cables et Transmissions", vol. 29, Dec. 1975, pp. 434–456.

Primary Examiner—Charles D. Miller
Attorney, Agent, or Firm—Sughrue, Mion, Zinn, Macpeak and Seas

[57] ABSTRACT

The present invention concerns a method for the serial transmission of binary data in which each binary digit is transmitted in the form of an elementary signal occupying a time interval known as the binary interval.

In this process a binary 1 is represented alternatively by a pulse or a space occupying the whole of the corresponding binary interval; a binary 0 is normally represented by a pulse occupying a half binary interval, except in the case where it is the first or the last one of a sequence of n+1 successive binary zeroes, the first being represented according to the above rule as a binary 0, except if the binary ones appeared after the preceeding sequence of n+1 successive binary zeros and are an even number, in which case it is represented as a binary 1 following the rule of alternation, the last being represented in accordance with the above rule as a binary 1 contradicting the alternation rule.

The invention can be used to advantage in fibre optic links joining junctions encoded in HDB$_3$.

10 Claims, 10 Drawing Figures

METHOD FOR THE SERIAL TRANSMISSION OF BINARY DATA AND DEVICES FOR ITS IMPLEMENTATION

The present invention is particularly concerned with transmission via optical fibres.

BACKGROUND

In a digital transmission system the basic signal is made up by first-order multiplexing at a rate of 2.048 M bit/s, corresponding to a capacity of 30 telephone channels. At equipment junctions this signal is transmitted by electric cables by means of high-density bipolar code designated $HDB_3$ and standardized by the CCITT.

The $HDB_3$ code is a special form of the HDBn code, which is a three-level $(-,0,+)$ bipolar code in which:
 the binary ones are represented by rectangular pulses having a duty factor of $\frac{1}{2}$, alternatively positive or negative,
 the binary zeros are represented by vacant time intervals except when they follow one another and are greater than n, in which case every sequence of $n+1$ successive zeros is replaced by a packing sequence of $n+1$ elements in which all the elements are zeros with the exception of the first and the last, the last element being an exception to the bipolarity rule, that is a pulse of duty factor $\frac{1}{2}$ of the same polarity as the one which preceeded it, the first element being either a zero or a normal bipolar one, the choice being made in such a way that the polarity of an exception is different from that of the last previous exception.

A digital signal encoded in HDBn has redundancy: a maximum of $n+1$ vacant time intervals and alternate polarity exceptions which enable the cadence to be restored and the D.C. component to be eliminated and which, moreover, enable certain line errors to be detected.

Current fibre optic transmission systems use light sources with on-off modulation which do not allow bipolar codes to be used—only binary codes. Of these, the most frequently used is the CMI code (coded mark inversion) in which:
 the binary ones are represented alternatively either by a rectangular pulse of duty factor 1 or by a vacant time interval
 and the binary zeros are represented by a rectangular pulse of duty factor $\frac{1}{2}$ occurring in the first half of a time interval or, according to a variant, in the second half of a time interval.

In the present systems, transcoding with intermediate decoding is carried out at the transition between a standard junction encoded in $HDB_3$ and a fibre optic link encoded in CMI. This has a disadvantage in that it does not allow errors affecting the signal ancoded in $HDB_3$ at the transmission junction to be checked at the receiving end because the data due to the $HDB_3$ code redundancy is lost in the intermediate decoding used during $HDB_3$—CMI transcoding at the start of the fibre optic link. In fact, a long series of zeros or non-alternating polarity exceptions affecting the signal encoded in $HDB_3$ at the transmission junction disappear during the $HDB_3=CMI$ and $CMI-HDB_3$ transcoding.

The object of the present invention is to avoid the aforesaid disadvantage by way of binary coding for optical fibre transmissions which, in the case of a link between two junctions standardized in HDBn, as regards reception, enables a signal encoded in $HDB_3$ to be restored which is completely identical to that at the transmission junction.

SUMMARY OF THE INVENTION

The present invention provides a method for the serial transmission of binary data in which each digit is transmitted in the form of an elementary signal occupying a time interval known as the binary interval. This method consists in:
 expressing each binary digit of an initial value as a signal element having alternatively either an initial level or a second level, both maintained throughout the entire binary interval;
 expressing each binary digit of a second value not belonging to a sequence of $n+1$ successive digits of the second value, as a signal element of the first level maintained during the first half of the binary interval and followed by a signal element of the second level maintained during the second half of the binary interval;
 and expressing binary digits of a sequence of $n+1$ successive digits of the second value in accordance with the above rule, with the exception of the first and the last, the first being expressed in accordance with the above rule as a digit of the second value except in the case where the binary digits of the first value appeared after the preceeding sequence of $n+1$ successive binary digits of the second value and are an even number, in this case it is expressed as a binary digit of the first value, the last being expressed as a binary digit of the first value contradicting the rule of alternation.

The present invention also provides an encoder and a decoder in order to utilize the above method of transmission in conjunction with received binary data to be reconverted into $HDB_3$ code.

The encoder comprises:
 a discriminator placed at the input, which separates the input signal pulses in relation to their polarity and restores them under a single polarity at two separate outputs, one reserved for pulses of positive origin, the other for pulses of negative origin,
 a double shaping circuit connected to the outputs of the discriminator which, under the action of a clock signal synchronized with the binary intervals of the input signal, expands the pulses appearing at the discriminator outputs, gives them a duty factor of 1/1 before passing them to two separate outputs, one reserved for pulses of positive origin, the other for originally negative pulses,
 a gating circuit connected to the outputs of the double shaping circuit which, under the action of the clock signal, delivers pulses of duty factor $\frac{1}{2}$ in the absence of pulses at the outputs of the double shaping circuit,
 and an adder connected to the output of the gating circuit and to that of the double shaping circuit delivering pulses of positive origin, which supplies the output signal for the encoder.

The decoder comprises:
 a clock regeneration circuit delivering an inverted clock signal whose period corresponds to one binary interval of the input signal and whose trailing edges coincide with the leading edges of the input signal, a logic "and" gate with two inputs, one fed with the decoder's input signal and the other the regenerated and inverted clock signal, a logic "nor" gate with two inputs which are connected in parallel with those of the "and" gate, a delay circuit connected to the output of the "nor" gate which, under the action of the regenerated and inverted clock signal, delays the pulses available at the output of the "nor" gate by a half binary interval, and a differential-input amplifier with one input connected to the output of the logic "and" gate and the other connected to that of the "nor" gate, the said amplifier delivering the output signal of the decoder.

The present invention further provides a regenerator and an error detector using the above transmission method.

The regenerator comprises:

a clock regeneration signal delivering a regenerated clock signal defining the binary intervals associated with data units contained in the signal to be regenerated, a delay circuit with its input fed with the regenerated clock signal and delivering a version of the regenerated clock signal, delayed by a period less than a half binary interval, and at a multiple close to the binary interval, a sampling circuit fed with the signal to be regenerated at one sampling input and with the regenerated and inverted versions of the clock signal at its sampling control inputs, ensuring brief sampling during the first half of each binary interval following a transition of the delayed version of the regenerated clock signal, a second sampling circuit with one sampling input fed with a complementary version of the signal to be regenerated and its sampling control inputs fed with the regenerated and delayed versions of the clock signal, ensuring brief sampling of the first and second halves of each binary interval following transitions of the delayed version of the regenerated clock signal, and a bistable flip-flop having a reset-to-1 input connected to the output of the first sampling circuit and a reset-to-zero input connected to the output of the second sampling circuit and delivering the regenerated signal.

The error detector comprises:

a clock regeneration circuit delivering an inverted clock signal whose period corresponds to one binary interval of the input signal and whose leading edges coincide with the trailing edges of the input signal, a logic "and" gate with two inputs, one fed with the error detector input signal and the other with the regenerated and inverted clock signal, a logic "nor" gate with two inputs which are connected in parallel with those of the "and" gate, a delay circuit connected to the output of the "nor" gate which, under the action of the regenerated and inverted clock signal, delays the pulses available at the output of the "nor" gate by a half binary interval, a frequency doubler connected to the output of the clock regeneration circuit, a bidirectional shift-register with four stages A, B, C and D, having a clock input connected to the output of the frequency doubler, parallel data inputs for stages A and B and a serial data input for right shift, set to logic level 1, parallel data inputs for stages C, D and a serial data input for left shift, set to logic level 0, a right shift control input activated by the output signal of the "and" gate and a left shift control input activated by the output signal of the delay circuit, and a logic circuit detecting left and right overflow in the shift-register as well as double shift in the same direction within the latter, and responding by emitting at the output of the error detector an error signal which is also to reset the shift-register to its initial state.

BRIEF DESCRIPTION OF THE DRAWINGS

Other features and advantages of the invention will become evident from the claims attached and from the description below given in relation to the drawings in which:

DETAILED DESCRIPTION

Figure 1:
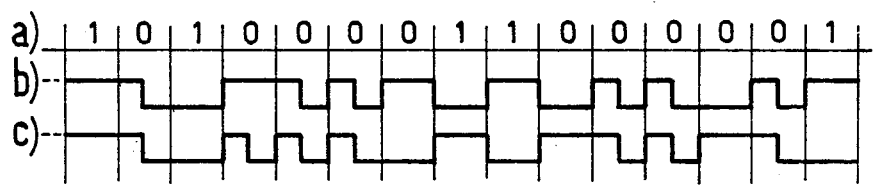
FIG. 1 shows a method for the transmission of binary data in accordance with the invention.

FIG. 1 shows a sequence of binary digits 0 and 1 at a frequency F or binary interval of duration 1/F, and in b and c, two versions of a binary signal shifting between a lower level known as zero level and a higher level referred to as positive level. In this signal:

a binary 1 is represented alternatively either by a positive pulse or by zero level, both extending over the period of a binary interval under consideration, a binary 0 not forming part of a sequence of four successive binary 0's is represented by a positive pulse occupying the first half of the binary interval under consideration, and in each sequence of four successive binary binary zeros, the binary 0's are represented, as before, by positive pulses occupying the first half of the binary intervals involved, with the possible exception of the first binary 0 of the sequence which is represented like a binary 1 by following the rule of alternation in the case where an even number of binary ones was emitted after the end of the preceeding sequence of four successive binary 0's, and with the exception of the last binary 0 of the sequence which is always represented in the same way as a binary 1 in contradiction of the alternation rule.

The above definition implies that the form of the signal representing the sequence of binary digits a depends on the binary digits which preceeded it. This form is either that of waveform b in the case where the last exception pulse preceeding the sequence of binary digits a, that is the fourth binary 0 of the last sequence of four successive binary 0's preceeding the series of binary digits a, was at zero level, or that of waveform c where the last exception pulse preceeding the series of binary digits a was at positive level.

In the case where the exception pulse preceeding the sequence of binary digits a was at zero level, that is as in waveform b, the last binary 1 of the sequence a in front of the first sequence of four successive binary 0's is represented by zero level. This means, by virtue of the rule of alternation, that the binary 1's between the two sequences of four successive binary 0's are an even number and that therefore the first binary 0 of the first sequence of four successive binary zeros could be represented as a binary 1 in accordance with the alternation rule, i.e. by a positive pulse extending over a complete binary interval.

Likewise, referring to waveform c, it can be stated that the last binary 1 preceeding the first sequence of four successive binary 0's is represented by zero level. Then, assuming the last exception pulse preceeding the sequence of binary digits a was in this case at positive level, the alternation rule would imply that the binary 1's between the two sequences of four successive binary 0's are an odd number and that therefore the first binary 0 of the first sequence of four successive binary 0's of the a series could be represented as an ordinary binary 0, that is, as a positive pulse occupying the first half of the binary interval under consideration.

The fourth binary 0 of the first sequence of four successive binary 0's of the a series is represented on waveform b by a positive pulse and on waveform c by zero level, both extending over the complete binary interval involved. In both cases this fourth binary 0 is represented in the same way as a 1 in contradiction of the alternation rule which allows for a positive pulse occupying a complete binary interval to follow a space during a binary interval, and vice versa. This does not take account of positive pulses occupying half binary intervals.

With the accepted definition, the alternation rule holds good as regards the exception pulses which always occur alternatively at positive and then at zero level or vice versa.

The binary coding just described may be expressed in general terms by replacing in the definition the sequences of four successive binary 0's by sequences of $n+1$ successive binary 0's. It can also be modified by shifting the positive pulses representing binary 0's not belonging to $n+1$ sequences of successive binary 0's, from the first to the second half of the binary intervals. Furthermore, the representations for the binary 0's or 1's may be interchanged or the positive pulses may be replaced by negative ones.

Regeneration of the cadence is easily accomplished because the signal obtained includes at least one transition per binary interval. It may be achieved by filtering in the region of the cycle frequency or by synchronizing an oscillator operating at the cycle frequency to the signal transitions from 0 to 1.

The binary coding just described exhibits the same redundancy as a HDBn bipolar code which, on the one hand, simplifies the transcoding operations with respect to the HDBn code and which, on the other hand, provides continuity of error checking for coding within transmission systems where it is used to link junctions encoded in HDBn. In order to illustrate this latter feature, and encoder operating from $HDB_3$ and a decoder providing $HDB_3$ will be described in detail. To obtain an encoder operating from binary data itself, it is only necessary to insert a $HDB_3$ encoder in front of the encoder to be described. Likewise, to obtain a decoder delivering binary data itself, it is only necessary to place a $HDB_3$ decoder after the decoder to be described. The $HDB_3$ encoder and decoder will not be detailed since they form part of the prior art. Some examples of them are described, in particular, in the article by T. A. MOORE entitled "Digital Transmission Coder: properties of $HDB_3$ and related Ternary Codes With Reference To Broadcast Signal Distribution" which appeared in the journal: "The Radio and Electronic Engineer" vol. 44 No. 8, August 74.

Figure 2:
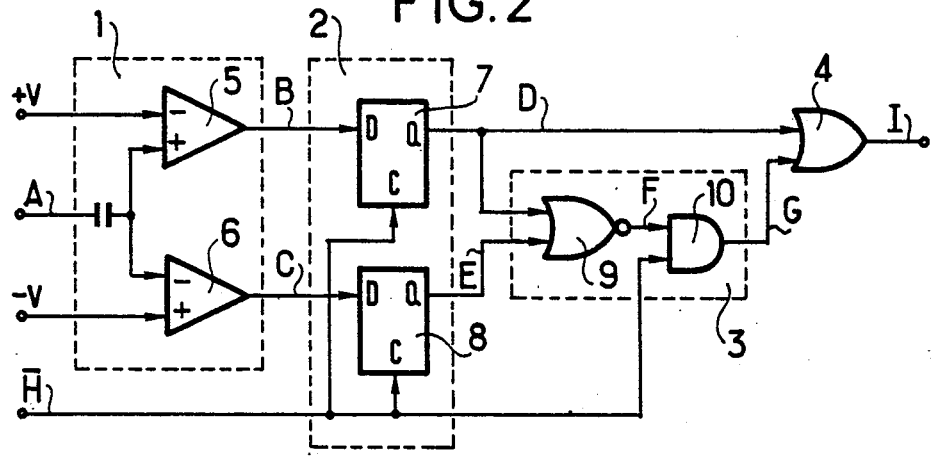
FIG. 2 is the circuit diagram of an encoder using the method in accordance with the invention, based on signals encoded in HDB$_3$.

FIG. 2 shows the circuit diagram of an encoder operating with binary data which is clocked and already in the $HDB_3$ form, and with an associated clock signal defining the binary intervals occupied by this data. The encoder comprises:

a discriminator 1 whose input is fed with the encoder's input signal A and which separates the input signal pulses according to their polarity and restores them with single polarity at its two outputs, one being reserved for pulses of positive origin, B, the other, C, being reserved for pulses of negative origin, a double shaping circuit 2, connected to outputs B and C of the discriminator 1 and to an encoder clock input $\overline{H}$, which, under the action of the clock signal, expands the pulses appearing at outputs B and C of the discriminator 1, gives them a duty factor 1/1 before delivering them at two separate outputs D and E, one, D, reserved for pulses of positive origin, the other, E, reserved for pulses of negative origin, a gating circuit, 3, connected to outputs D and E of the double shaping circuit 2 and to the encoder's clock input $\overline{H}$, which, under the action of the clock signal, emits pulses of duty factor ½ in the absence of pulses at outputs D and E of the double shaping circuit 2, and an adder, 4, connected to output G of the gating circuit 3 and to output D of the double shaping circuit 2, which delivers the output signal of the encoder.

The discriminator 1 comprises two comparators 5 and 6, one, 5, with its non-inverting input connected to the encoder's input signal A and its inverting input connected to a positive reference voltage source, and the other, 6, with its inverting input connected to the encoder's input signal A and its non-inverting input connected to a negative reference voltage source, the absolute values of the positive and negative reference voltages being less than the amplitudes of the input signal pulses encoded in $HDB_3$.

The double shaping circuit 2 comprises two D-type flip-flops 7 and 8 with the data input of one, 7, connected to output B of the discriminator 1 and that of the other, 8, connected to output C of the latter, and with their clock inputs connected to the clock input H of the encoder.

Circuit 3 comprises a logic "nor" gate 9 with two inputs which are connected to the two outputs D and E, respectively, of the double shaping circuit 2, and a logic "and" gate 10 with two inputs, one of which is connected to output F of the "nor" gate 9, the other to the encoder's clock input $\overline{H}$.

The adder 4 comprises a logic "or" gate with two inputs, one connected to output D of the double shaping circuit 2 and the other to output G of the gating circuit 3.

The encoding of a signal in the HDB$_3$ form in simpler than with binary data itself because a certain number of operations necessary to the encoding are carried out during conversion into HDB$_3$, in particular, the distinction between binary 1's in relation to their even or odd numbering and the determination of the first and last digits of a sequence of four successive binary 0's including the exceptions to the alternation rule. It is obtained according to the following rule:

- a positive input signal pulse in the HDB$_3$ form is expanded so as to occupy a complete binary interval,
- a negative input signal pulse in the HDB$_3$ form is ignored
- and an absence of pulses during the binary interval of the HDB$_3$ type input signal is transformed into a pulse occupying the first half of the binary interval.

This rule is biunivocal. Application of its reciprocal during decoding enables a signal to be recovered at any point identical to that encoded. Consequently, it makes it possible at the receiving end to monitor transmission errors affecting the transmitted signal encoded in HDB$_3$.

The encoder applies the above rule with a delay of one half binary interval. The positive input signal pulses of the encoder, after having been detected by the discriminator 1, are delayed by a half binary interval and controlled by the flip-flop 7 which is activated by the leading edges of its clock signal, then transmitted to the output of the encoder via the "or" gate 4. The negative input signal pulses of the encoder, after having been detected by the discriminator 1, are delayed by a half binary interval and expanded by flip-flop 8 which is activated by the leading edges of its clock signal, then used to inhibit the gating circuit 3 without being transmitted to the output of the encoder. An absence of pulses during a binary interval of the encoder's input signal is represented with a delay of one half binary interval by a space (no-pulse interval) at outputs D and E of flip-flops 7 and 8 and detected by "nor" gate 9 which enables the "and" gate 10. The latter then allows, via the "or" gate 4, a clock pulse to be transmitted at the output of the encoder, which allowing for the half binary interval delay due to flip-flop 7, appears in the first half of a binary interval of the encoder's output signal.

Figure 3:
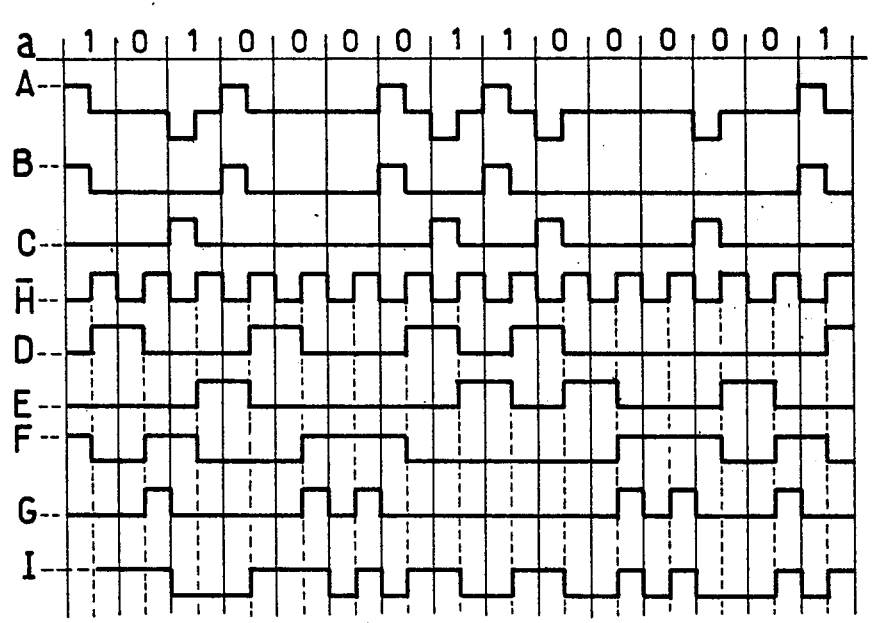
FIG. 3 is a set of waveforms explaining the operation of the encoder shown in FIG. 2.

The waveforms in FIG. 3 show the signals at different points of the encoder. At the top is shown the sequence of binary digits as repeated from FIG. 1. The other waveforms are identified at the left-hand side with the capital letters taken from FIG. 2 which indicate on the latter the points where the signals represented appear. The form of the signal applied to input A of the encoder is that of a signal in HDB$_3$ corresponding to the sequence of binary digits a, assuming that the exception pulse preceeding that sequence was negative, from which assumption, using the transmission method described above, one obtains a signal whose form is shown in b of FIG. 1. The waveform representing the signal at output I of the encoder is that of graph b in FIG. 1 and has an approximate delay of one half binary interval.

Figure 4:
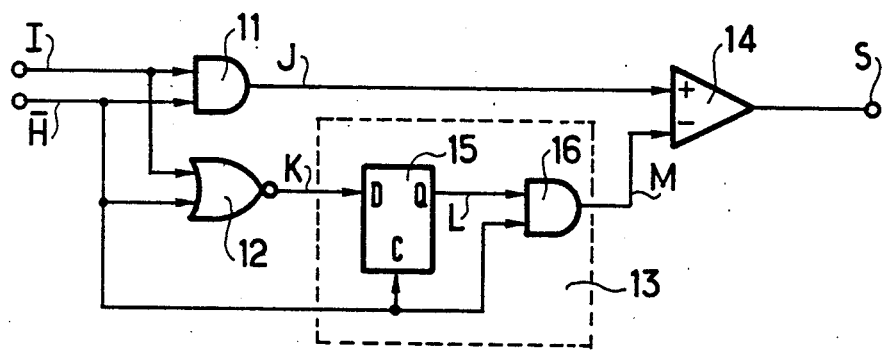
FIG. 4 shows the circuit diagram of a decoder which can be used to transcode into HDB$_3$ the signals obtainable from the encoder represented in FIG. 2.

A decoder matched to the signal delivered by the afore-mentioned encoder is shown in FIG. 4, with the exception of its clock regeneration circuit. On this figure are shown:

- a logic "and" gate 11 with two inputs, of which one forms the decoder's input and the other is connected to the output $\overline{H}$ of a clock regeneration circuit.
- a logic "nor" gate 12 with two inputs which are connected in parallel to those of the "and" gate 11,
- a delay circuit 13 connected to output K of the "nor" gate 12 and providing a delay equal to one half of the binary interval
- and a differential amplifier 14 whose inverting input is connected to output J at the "and" gate 11 and whose non-inverting input is connected to output M of the delay circuit 13.

The delay circuit 13 comprises a D-type flip-flop 15 activated by the leading edges of its clock signal, and a logic "and" gate having two inputs 16. The D-type flip-flop 15 is connected via its data input to output K of the "nor" gate 12 and via its clock input to output $\overline{H}$ of the clock regeneration circuit. The "and" gate 16 has one of its inputs connected to the non-inverting output of flip-flop 15 and the other to output $\overline{H}$ of the clock regeneration circuit.

Figure 6:
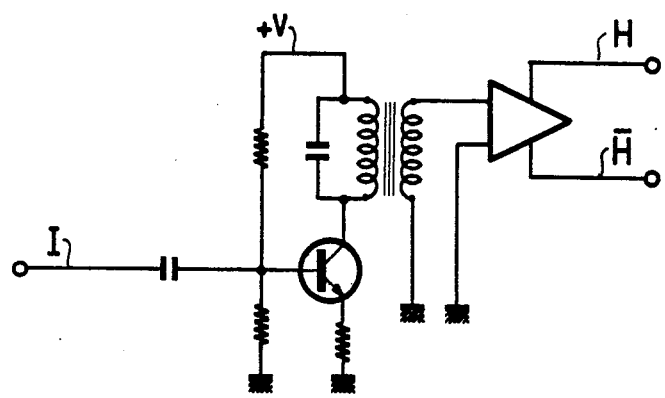
FIG. 6 is the diagram of a clock regeneration circuit which can be used in the decoder shown in FIG. 4.

The clock regeneration circuit operates by way of the decoder's input signal. It can be constructed, as shown in FIG. 6, with the aid of a transistor amplifier loaded by an L C oscillatory circuit of high Q-factor and tuned to the clock frequency. It is followed by a square-wave shaper-emplifier with two complementary outputs, one delivering a regenerated clock signal H whose leading edges coincide with those of the decoder's input signal, i.e. with the start of the binary intervals, and the other $\overline{H}$ delivering a regenerated and inverted clock signal whose trailing edges coincide with the leading edges of the decoder's input signal.

Decoding is achieved in accordance with the inverse of the rule which applies to encoding:

- a pulse extending over a complete binary interval is converted into a positive pulse occupying the first half of the binary interval,
- a no-pulse interval during a complete binary interval is converted into a negative pulse occupying the first half of the binary interval
- and a pulse occurring during the first half of the binary interval is ignored.

Pulses occupying a complete binary interval of the input signal of the decoder can be identified when appearing in the second half of a binary interval and can be detected in this way with the aid of the logic "and" gate 11 with a half binary interval delay.

The binary intervals without pulses in the decoder's input signal are identified by the absence of a pulse in their first half and are detected in this way with the aid of the logic "nor" gate 12 without delay.

The delay circuit 13 allows the detection of the pulses and spaces occupying a complete binary interval to be synchronized. The D-type flip-flop 15 triggered in the middle of each binary interval by the regenerated clock signal available at $\overline{H}$, effects this synchronization by delaying the pulses delivered by the "nor" gate 12 by a half binary interval. The "and" gate 16 calibrates the pulses delivered by the D-type flip-flop 15.

The differential amplifier 14 delivers a bipolar signal whose positive pulses correspond to these delivered by the "and" gate 12 and whose negative pulses correspond to the positive pulses delivered by the delay circuit 13.

Figure 5:
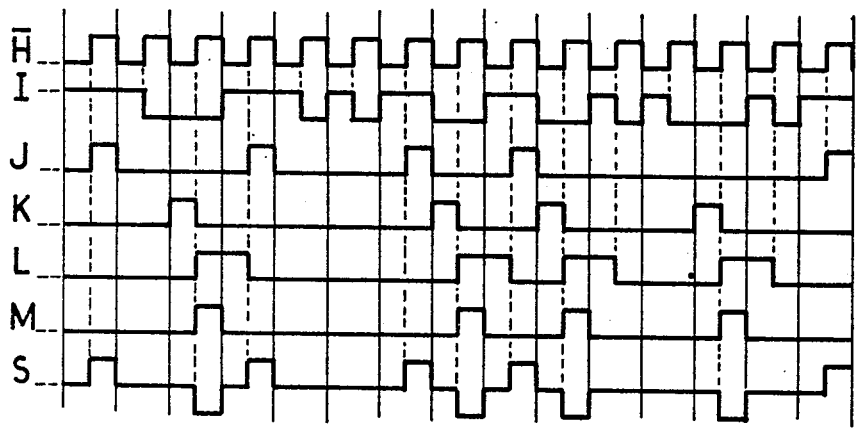
FIG. 5 is a set of waveforms explaining the operation of the decoder shown in FIG. 4.

The waveforms in FIG. 5 show the form of signals at different points in the decoder. They are identified on the left-hand side by capital letters repeated from the diagram in FIG. 4 and indicate on the latter the points where the signals represented appear. The regenerated clock signal available at $\overline{H}$ exhibits, like the clock signal used for encoding, a leading edge in the middle of each binary interval. The form of the signal applied to the input I of the decoder is that of the encoder's output signal shown with the same identification letter in FIG. 3 and obtained from a $HDB_3$ type signal applied to the input of the encoder and represented by A in FIG. 3. At the output of the decoder it gives rise to a bipolar signal whose form is shown by S in FIG. 5 and which corresponds to that of the encoder's input signal represented by A in FIG. 3 with an approximate delay of a half binary interval.

Figure 7:
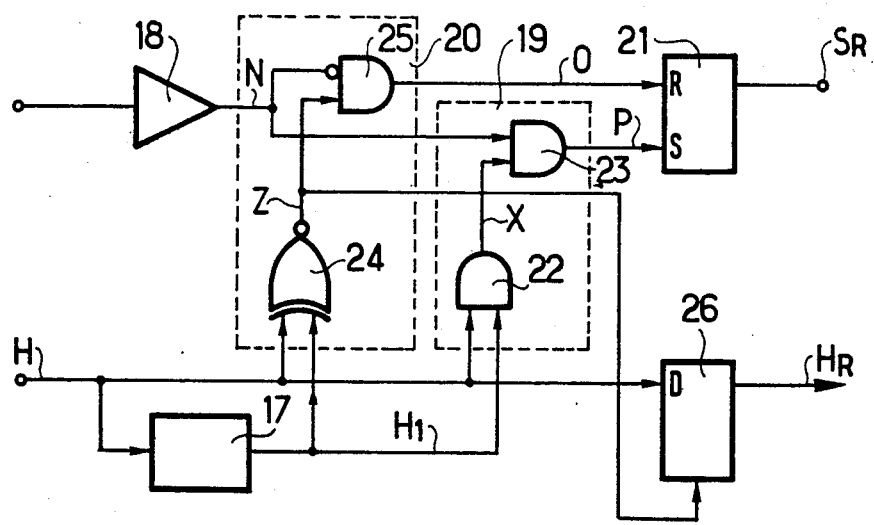
FIG. 7 is the circuit diagram of a regenerator which can be used with the signal delivered by the encoder shown in FIG. 2.

FIG. 7 shows the circuit diagram of a regenerator which can be used to restore the signal delivered by the encoder shown in FIG. 2. This regenerator, like the above decoder, is represented without its clock regeneration circuit. On this figure are shown:

- a delay circuit 17 connected to output H of a clock regeneration circuit, not shown, delaying the regenerated clock signal by a period less than a half binary interval at a multiple close to the binary interval,
- a shaping circuit 18 placed at the input of the regenerator,
- a sampling circuit 19 connected via one sampling input to the output of the shaping circuit 18 and by sampling control inputs to outputs H and $H_1$ of the clock regeneration circuit and of the delay circuit 17, ensuring sampling of the signal to be regenerated during a short interval before the end of the first half of each binary interval, following a transition of the delayed version of the regenerated clock signal,
- a second sampling circuit 20 connected via one sampling input to the output of the shaping circuit 18 and by sampling control inputs to outputs H and $H_1$ of the clock regeneration circuit and of the delay circuit 17, ensuring sampling of the signal to be regenerated during a short interval before the end of the first and second halves of each binary interval following a transition of the delayed version of the regenerated clock signal
- and a bistable flip-flop 21 whose reset-to-1 input is connected to the output P of the first sampling circuit 19 and whose reset-to-zero input is connected to output O of the second sampling circuit 20.

The clock regeneration circuit operates by way of the signal to be regenerated. It can be identical to that shown in FIG. 6. But the output used is output H at which appears a clock signal having leading edges coincident with those of the signal to be regenerated.

Figure 9:
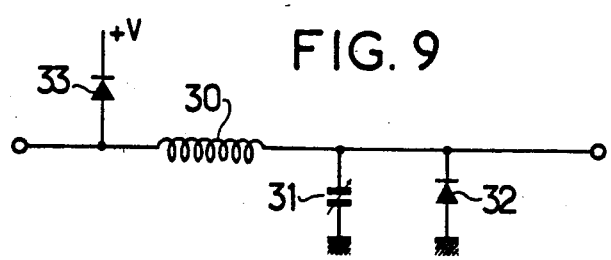
FIG. 9 shows the diagram of a possible delay circuit used in the regenerator in FIG. 7.

The delay circuit may be constructed as shown in FIG. 9, with the aid of an inductance 30 connected in series with its input and output and a variable capacitance 31 connected between its output and ground, the capacitance 31 and the inductance 30 forming a series oscillatory circuit approximately tuned to the clock frequency. It is completed by clipping diodes 32 and 33.

The first sampling circuit 19 operates as a logic "and" function. It comprises a logic "and" gate 22 with two inputs, one connected to the output H of the clock regeneration circuit, the other to output $H_1$ of the delay circuit 17, and a second logic "and" gate 23 with two inputs, one connected to output X of the first "and" gate 22, the other to output N of the shaping circuit 18.

The second sampling circuit 20 comprises a logic "exclusive nor" gate 24 with two inputs, one connected to output H of the clock regeneration circuit, the other to output $H_1$ of the delay circuit 17, and a logic "and" gate 25 with two inputs, one connected to output Z of the "exclusive nor" gate 24, the other connected via an inverter to output N of the shaping circuit 18.

The bistable flip-flop 21 is a R-S flip-flop connected via its reset-to-1 input to output P of the "and" gate 23 and by its reset-to-zero input to output 0 of the "and" gate 25. It delivers the regenerated signal at its non-inverted output $S_R$.

Also in the diagram in FIG. 7 is a D-type flip-flop 26 connected by its data input to output H of the clock circuit and by its clock input to output Z of the "exclusive nor" gate 24. This flip-flop 26 provides at its non-inverted output $H_R$ a clock signal synchronized to the regenerated signal available at output $S_R$ of the R-S flip-flop 21.

Regeneration of the signal is effected by synchronizing its transitions with the delayed version of the regenerated clock signal. This synchronization is effected with the aid of flip-flop 21 whose 0-1 transitions are controlled, its non-inverted output being at logic level 0, by the appearance of a logic level 1 at the output of the first sampling circuit 19 and whose 1-0 transitions are controlled, its non-inverted output being at logic level 1, by the appearance of a logic level 1 at the output of the second sampling circuit 20.

A 0-1 transition of the signal delivered by the encoder in FIG. 2 may only occur at the start of a binary interval. In order to regenerate it, it is necessary to carry out sampling within the first and second halves of each binary interval after each transition of the delayed version $H_1$ of the regenerated clock signal, that is, during the periods where the regenerated clock signal H and its delayed version $H_1$ are simultaneously in the same logic state. The order of sampling is therefore provided by the "exclusive nor" gate 2 and the sampling is carried out by the "and" gate 25, the value of the sample being complemented by an inverter for correct control of the R-S flip-flop 21.

In order to limit the effect of spurii to a minimum, the duration of samples is reduced to a minimum compatible with the correct operation of the R-S flip-flop 21 by adjusting the delay provided by the delay circuit 17 to a value below but close to a half binary interval.

Figure 8:
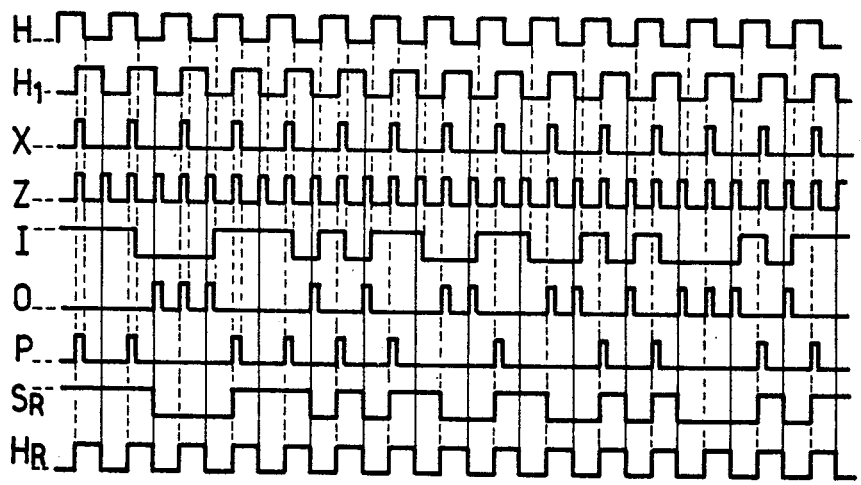
FIG. 8 is a set of waveforms explaining the operation of the regeneration circuit shown in FIG. 6.

The waveforms in FIG. 8 show the signals at different points of the regenerator. They are identified at the left-hand side by capital letters taken from the circuit diagram in FIG. 7 and indicate on the latter the points where the signals represented appear.

Figure 10:
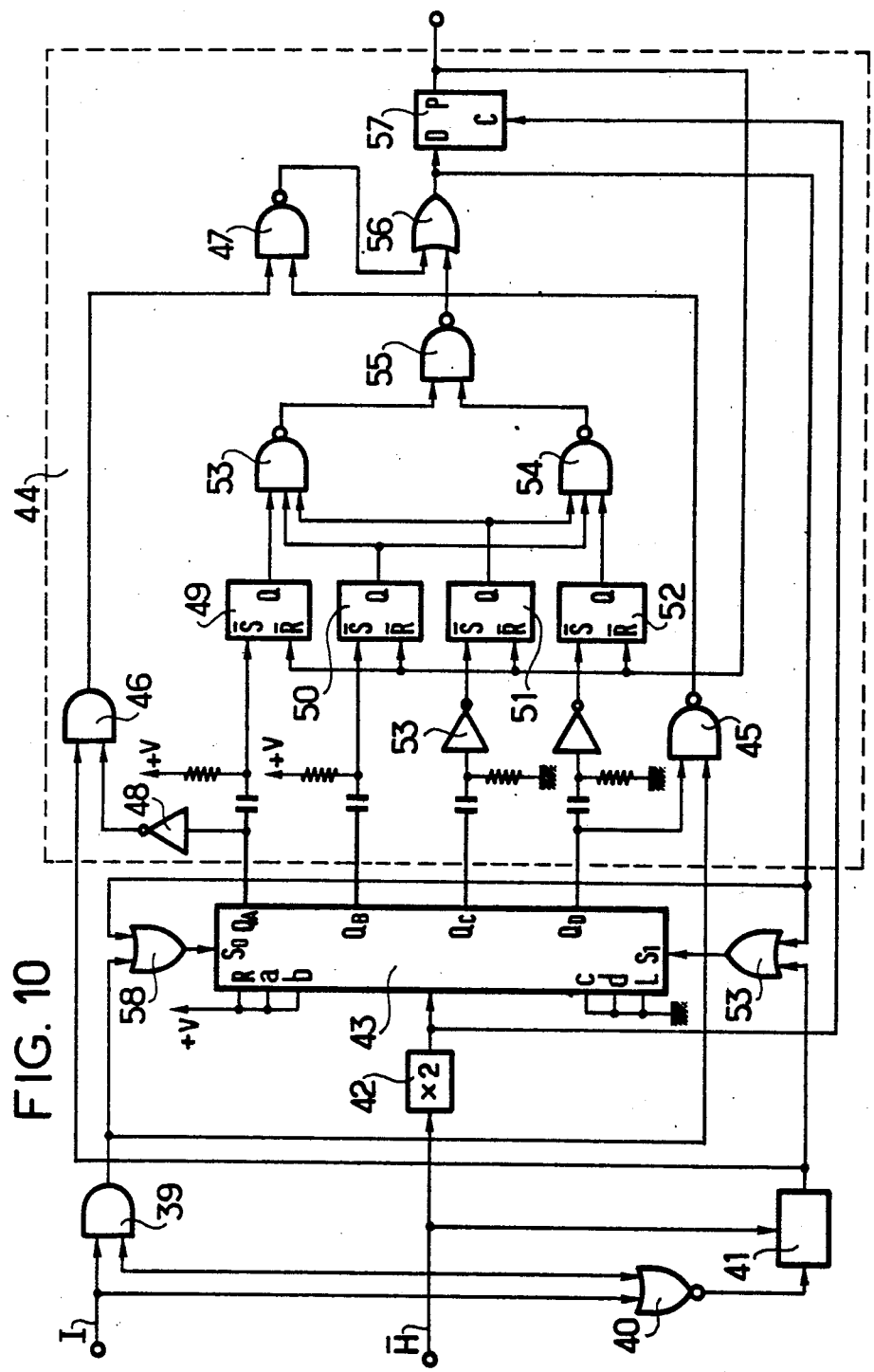
FIG. 10 is the circuit diagram of an error detector which can be used with the encoder signals shown in FIG. 2.

FIG. 10 shows the circuit diagram of an error detector which can be used for monitoring the signal delivered by the encoder described in conjunction with FIG. 2. The error detector is shown without its clock regeneration circuit. Apart from the latter, it comprises:

a logic "and" gate 39 with two inputs, one, I, being the error detector's input, the other being connected to the $\overline{H}$ output of a clock regeneration circuit, a logic "nor" gate 40 with two inputs connected in parallel to those of the "and" gate 39, a delay circuit 41 connected to the output of the "nor" gate 40 and to the $\overline{H}$ output of the clock regeneration circuit, providing a delay of one half binary interval for pulses delivered by the "nor" gate 40, a frequency doubler 42 connected to the $\overline{H}$ output of the clock regeneration circuit, a bidirectional shift-register 43 with four stages A, B, C, D having a clock input $C_1$ connected to the output of the frequency doubler 42, parallel data inputs a, b for stages A and B, and a serial data input R for right shift set to logic level 1, parallel data inputs c, d for stages C and D, and a serial data input L set to logic level 0, a right shift control input $S_0$ activated by the signal from the "and" gate 39 and a left shift control input $S_1$ activated by the output signal of the delay circuit 41 and a logic circuit 44 detecting right and left overflow in the shift-register 43 as well as double shift in the same direction within the latter and responding by emitting an error signal which is also used to reset the shift-register to its initial state.

The clock regeneration circuit can be identical to that described above in relation to FIG. 6. The output used, as in the case of the decoder, is the $\overline{H}$ output at which appears a regenerated clock signal having 0-1 transitions in the middle of the binary intervals associated with data contained in the signal applied to input I of the error detector.

The delay circuit 41 may be constructed in a similar way to that, 13, of the decoder shown in FIG. 2.

The frequency doubler 42 may be constructed with the aid of a logic "exclusive nor" with two inputs connected to output $\overline{H}$ of the clock regeneration circuit, one directly, the other via a delay circuit introducing a delay equal to a half binary interval. It delivers a squarewave having 0-1 transitions in the middle of each binary interval.

The four-stage bidirectional shift-register is a TTL integrated circuit known under the number 74 194. It has two shift control inputs $S_0$ and $S_1$ which allow the register to be inhibited when they are both at logic level 0, to authorize shifts to the right when the control input $S_0$ is at logic level 1 and control input $S_1$ is at logic level 0, to authorize shifts to the left when the $S_0$ control input is at logic level 0 and control input $S_1$ is at logic level 1 and to allow loading of register stages via its parallel data inputs a, b, c, d when both are at logic level 1.

The logic circuit 44 has three logic "nand" gates 45, 46 and 47 which are used to detect right and left overflows in the shift-register 43. The "nand" gate 45 has two inputs, one connected to the output of the "and" gate 39, the other to the $Q_D$ output of stage D of the shift-register 43. It detects the simultaneous appearance of a right shift instruction and a logic level 1 at the stage D output of the shift register 43. The "nand" gate 46 has two inputs, one connected to the output of the delay circuit 41, the other to the $Q_A$ output of stage A of the shift-register 43 via an inverter 48. It detects the simultaneous appearance of left shift instruction and a logic level 0 at the output of stage A of the shift-register 43.

The "nand" gate 47 has two inputs, one connected to the output of the "nand" gate 45, the other to the output of "nand" gate 46. Its output is at logic level 1 when an overflow to the right or left occurs in the shift-register 43.

Logic circuit 44 also has four R-S flip-flops 49, 50, 51 and 52 with complementary inputs used to store the 1-0 transitions of stages A and B of the shift-register 43 and the 0-1 transitions of stages C and D of the latter. R-S flip-flop 49 has its complement input $\overline{S}$ at logic level 1 due to a resistor which connects it to a positive voltage source $+V$ and is connected via a capacitor to the $Q_A$ output of stage A of the shift-register 43. A 1 to 0 transition in stage A causes, via the capacitance, a negative pulse to appear at the complement input $\overline{S}$ of the R-S flip-flop 49 whose output goes to logic level 1 if it was not already at that level. A 0 to 1 transition in stage A has no effect. R-S flip-flop 50 which is connected in like manner to the $Q_B$ output of stage B of the shift-register 43, is triggered only on 1-0 transitions in this stage. R-S flip-flop 51 has its complement input $\overline{S}$ preceeded by an inverter 53 whose input is taken to logic level 0 by a resistor which connects it to ground and is connected via a capacitance to output $Q_C$ of stage C of the shift-register 43. A transition from 0 to 1 in stage C causes, via the capacitance, a positive pulse to be applied to the input of inverter 53 which triggers R-S flip-flop 51 whose output goes to logic level 1 if it was not already so. A 1 to 0 transition in stage C has no effect. R-S flip-flop 52 is connected in like manner to the $Q_D$ output of stage D of the shift-register 43 and is only triggered by 0 to 1 transitions in this stage. The outputs of these four flip-flops 49, 50, 51 and 52 are connected to a circuit formed from three logic "nand" gates 53, 54, 55, which detect the presence of a logic level 1 at three of the outputs. The "nand" gate 53 has three inputs connected to outputs of R-S flip-flops 49, 50, 51. Its output goes to logic level 0 only when the outputs of R-S flip-flops 49, 50, 51 are all at logic level 1. The "nand" gate 54 has three inputs connected to the outputs of R-S flip-flops 50, 51, 52. Its output goes to logic level 0 only when the outputs of R-S flip-flops 50, 51, 52 are all at logic level 1. "Nand" gate 55 has two inputs connected to the output of the "nand" gate 53 and to the output of "nand" gate 54, respectively. Assuming that the initial state of the shift-register 43 has its a and b stages at logic level 1 and its c and d stages at logic level 0, the "nand" gate 54 has logic level 1 at its output when the outputs of at least three of the four stages of the shift-register 43 have changed state.

The outputs of "nand" gates 47 and 55 are connected via a logic "or" gate 56 to the data input of a D-type flip-flop 57 and, via two "or" gates 58 and 59, to the shift control inputs of the shift-register 43. The D-type flip-flop 57 has its clock input connected to the output of the frequency doubler 42 and its non-inverted output connected to that of the error detector and also to the complement inputs $\overline{R}$ of R-S flip-flops 49, 50, 51 and 52.

The error detector just described monitors the alternation in the signal of pulses occupying a complete binary interval and binary intervals without pulses. It is triggered when this alternation is not complied with by the exception pulses.

The logic "and" gate 39 at the input plays a part similar to that, 11, placed at the input of the decoder shown in FIG. 2. It enables binary intervals occupied entirely by one pulse to be detected and in these cases emits a pulse occupying the second half of the binary intervals in question.

The logic "nor" gate 40 also placed at the input, has the same role as that, 12, at the input of the decoder shown in FIG. 2. It enables binary intervals without pulses to be detected and emits in these cases pulses occupying the first half of binary intervals under consideration. These pulses are replaced in the second half of the binary intervals by the delay circuit 41. This allows the first half of each binary interval to be left free for possible zero resets for R-S flip-flops 49, 50, 51, 52 and resetting of the shift-register 43, as will be seen later.

The appearance, in the input signal of the error detector, of a binary interval which is entirely occupied by a pulse, causes, in the middle of the second half of this interval, a right shift in the shift-register 43. That of a binary interval without a pulse causes, in the middle of the second half of that one, a left shift in the shift-register 43. That of a binary interval where only one half is occupied by a pulse has no effect and no further mention will be made of it.

In order to explain the operation of the shift-register, the position following the resetting of the shift-register 43 to its initial state and the resetting to zero of the R-S flip-flops 49, 50, 51, 52 is taken as the starting point.

In the absence of an exception to the alternation rule in the input signal of the error detector, a binary interval wholly occupied by a pulse follows a binary interval without a pulse and vice versa. In the case of the shift-register 43, this results in alternate right and left shifts and vice versa which are interpreted as transitions between logic levels 1 and 0 in one of the B and C stages of the shift-register 43 and as a change to logic level 1 in the associated R-S flip-flop on the first transition. It will be assumed for the remainder of the explanation that this involves stage B.

The appearance of the first exception to the rule of alternation in the input signal of the error detector produces two successive shifts in the same direction in the shift-register 43. This results, on the one hand, in a change of stage in the shift-register 43 whose output is likely to toggle between logic levels 0 and 1 when binary intervals wholly occupied by pulses and binary intervals without a pulse are subsequently detected and follow in alternating fashion, this stage—in the hypothesis under consideration and in accordance with the direction of the two successive shifts—becoming either stage A or stage C and, on the other hand, in the output of the associated R-S flip-flop being changed, at logic level 1, to the new stage, i.e. A or C.

The appearance of a second exception to the rule of alternation in the input signal of the error detector can have three separate effects.

Firstly, it can produce two successive shifts in directions opposite to those caused by the first exception. This is the case where the alternation rule is respected vis-a-vis the exceptions, the first appearing as two binary intervals, each completely occupied by a pulse and the second appearing as two binary intervals without pulses, and vice versa. There are therefore no errors. The shifts produced by the second exception in the shift-register 43 cancel the effects of shifts produced by the first exception and stage B becomes that stage whose output toggles between logic levels 0 and 1. The error detector does not emit any pulse.

It may also produce two successive shifts in the same direction as those caused by the first exception when the stage whose output had changed level following the first exception was stage C. These two successive shifts in the same direction as those caused by the first exception show that the rule of alternation has not been respected and that there is an error. As a result they cause the output of register D to toggle from logic level 0 to logic level 1, which leads to the toggling of R-S flip-flop 52 whose output changes to logic level 1. The outputs of the three R-S flip-flops 50, 51, 52 are then at logic level 1, which causes the output of logic "nand" gate 55 and that of the "or" gate 56 to go to logic level 1. This latter causes in the middle of the first half of the binary interval following that in which the second exceptionn appeared (instant corresponding to the appearance of the first 0 to 1 transition in the signl delivered by the frequency doubler 42 following the appearance of logic level 1 at the output of the logic "or" gate 56) on the one hand, the shift-register to be reset to its initial state and, on the other hand, the output of the D-type flip-flop 57 to go to logic level 1, which instructs the flip-flops 49, 50, 51, 52 to be reset to zero and as a result causes logic level 1 at the output of the "or" gate 56 to disappear, this causes, in the middle of the second half of the binary interval following that in which the second exception occurs, the output of D-type flip-flop 57 to return to logic level 0. The error is thus indicated by the emission at the output of the error detector of a pulse of duty factor ½ centered on the binary interval following that one in which it was produced.

The appearance of the second exception may also produce two successive shifts in the same direction as those caused by the first exception when the stage whose output had changed level following the first exception, was stage A. As before, these two successive shifts in the same direction as those caused by the first exception show that the rule of alternation has not been respected vis-a-vis the exceptions and that there is an error, but their effects on the shift-register 43 are different. With the assumptions made, the two successive shifts are shifts to the left. The first causes logic levels 0 to appear at the outputs of all of the stages of the shift-register 43. The second does not change these levels because the shift-register 43 has an overflow to the left. But the control signal applied to S₂ having caused this shift, inhibits the "nand" gate 46 which causes the output of the "nand" gate 47 and that of the "or" gate 56 to go to logic level 1 when the second exception appears. This logic level 1 causes, in the middle of the second half of the binary interval in which the second exception appeared (instant corresponding to the first 0 to 1 transition of the signal delivered by the frequency doubler 42 after the appearance of this logic level 1), on the one hand, the shift-register to be reset to its initial state and consequently the disappearance of this logic level 1 and, on the other hand, the D-type 57 to go to logic level 1, which instructs R-S flip-flops 49, 50, 51 and 52 to be reset to zero. The disappearance of logic level 1 at the output of the logic "or" gate 56, following the resetting of the shift-register 43 to its initial state, causes the output of the D-type flip-flop 57 to return to logic level 0 in the middle of the first half of the binary interval following the second exception. The error is thus indicated at the output of the detector by a pulse of duty factor ½ spanning the binary interval in which the second exception appeared and the binary interval which follows it.

In order to synchronize the pulses issuing from the error detector, a delay circuit introducing a delay of a half binary interval to the output signal of the "nand" gate 47, may be used between the "nand" gate 47 and the "or" gate 56.

Certain of the arrangements may be modified or certain of the measures may be replaced by equivalent ones without going beyond the purview of the invention.

I claim:

1. An encoder for receiving data input signal pulses representing a series of binary data digits having first and second values, said series including at least first and second sequences of (n+1) successive binary digits of said second value, said first sequence preceding said second sequence and each of said sequences having first and last digits, m digits of said first value occurring in said series between said first and second sequences, where m is a non-negative integer, said encoder providing an encoder output signal representing said data input signal and comprising a series of first and second elementary signals each having at least one of first and second levels and occupying a time interval known as the binary interval, said first elementary signals having only one of said first and second levels for the duration of said binary interval and said second elementary signals having said first level during the first half of said binary interval and said second level during the second half of said binary interval, said encoder output signal comprising a first elementary signal representing each binary data digit of said first value, the level of said first elementary signal representing a digit of said first value being different from the level of the most recent preceding first elementary signal in said encoder output, a second elementary signal representing each binary data digit of said second value, except said first and last digits, a first elementary signal representing said first digit in said second sequence when m is an even number, the level of said first elementary signal representing said first digit in said second sequence being different from the level of the most recent first elementary signal in said encoder output, a second elementary signal representing said first digit in said second sequence when m is an odd number, and a first elementary signal representing said last digit, the level of said first elementary signal representing said last digit being the same as the level of the most recent first elementary signal in said encoder output, said data input signal pulses comprising a three-level high-density bipolar (HDBn) code having positive and negative polarities, said encoder comprising:

discriminator means (1), having an input (A) receiving said data signal input, for separating said data input signal pulses in accordance with their polarity, said discriminator having a first output (B) for providing a train of pulses having one polarity and corresponding to said data input signal pulses having positive polarity, and a second output (C) for providing a train of pulses of said one polarity and corresponding to data input signal pulses having a negative polarity;

a clock signal generator for generating an encoder clock input;

a double shaping circuit (2), connected to said first and second outputs of said discriminator and to said encoder clock input ($\overline{H}$), said double shaping circuit under the action of said clock input expanding the pulse trains appearing at the first and second outputs of said discriminator and providing said pulses with a duty factor of 1/1, said double shaping circuit having a first output (D) for providing a first train of expanded pulses representing pulses of said data input signal of positive polarity and a second output (E) for providing a second train of expanded pulses corresponding to pulses in said data input signal having negative polarity;

a gating circuit (3), receiving said first and second expanded pulse trains and said encoder clock input, said gating circuit having an output (G) and providing under the action of said clock signal a train of pulses having a duty factor of $\frac{1}{2}$ during the absence of pulses in said first and second expanded pulse trains; and an adder (4) receiving the output (G) of said gating circuit and also receiving said first expanded pulse train, the output of said adder comprising said encoder output signal.

2. The encoder in accordance with claim 1, characterized in that the discriminator (1) comprises two comparators (5,6), one (5) with its non-inverting input connected to the data signal input (A) of the encoder and its inverting input connected to a positive reference voltage source, and the other (6) with its inverting input connected to the data signal input (A) of the encoder and with its non-inverting input connected to a negative reference voltage source.

3. The encoder in accordance with claim 1, characterized in that the "gating" circuit (3) comprises a logic "nor" gate (9) with two inputs which are connected to the outputs of the double shaping circuit (2) and to a logic "and" gate (10) with two inputs, one connected to the output of the logic "nor" gate (9), the other to the encoder's clock input ($\overline{H}$).

4. The encoder in accordance with claim 1, characterized in that the double shaping circuit (2) comprises two D-type flip-flops (7,8) having data inputs and clock inputs and triggered by 0 to 1 transitions at said clock inputs, connected via their data inputs to the outputs of the discriminator (1) and via their clock inputs to the clock input of the encoder ($\overline{H}$) which receives said encoder clock signal having 0 to 1 transitions in the middle of the binary intervals.

5. A decoder for receiving a decoder input signal representing a series of binary data digits having first and second values, said series including at least first and second sequences of (n+1) successive binary digits of said second value, said first sequence preceding said second sequence and each of said sequences having first and last digits, m digits of said first value occurring in said series between said first and second sequences, where m is a non-negative integer; said decoder input signal comprising a series of first and second elementary signals each having at least one of first and second levels and occupying a time interval known as the binary interval, said first elementary signals having only one of said first and second levels for the duration of said binary interval and said second elementary signals having said first level during the first half of said binary interval and said second level during the second half of said binary interval, said decoder input signal comprising a first elementary signal for each binary digit of said first value, the level of said first elementary signal representing a digit of said first value being different from the level of the most recent preceding first elementary signal in said decoder input signal; a second elementary signal for each binary digit of said second value, except said first and last digits; a first elementary signal for said first digit in said second sequence when m is an even number, the level of said first elementary signal representing said first digit being different from the level of the most recent first elementary signal and said decoder input signal; a second elementary signal for said first digit in said second sequence when m is an odd number; and a first elementary signal for said last digit, the level of said first elementary signal representing said last digit being the same as the level of the most recent first elementary signal in said series, said decoder receiving said decoder input signal and providing as a decoder output signal a three-level high density bipolar (HDBn) code, said decoder comprising:

a clock regeneration circuit receiving said decoder input signal and generating therefrom a clock signal defining said binary intervals, said clock signal having zero-to-one transitions coinciding with those of said decoder input signals;

a logic AND gate (11) having a first input for receiving said decoder input signal and a second input coupled to the output of said clock regeneration circuit;

a logic NOR gate (12) having first and second inputs coupled to said first and second inputs, respectively, of said AND gate (11);

a delay circuit (13) for receiving said clock signal and the output (K) of said NOR gate, said delay circuit delaying said NOR gate output by a half binary interval; and a differential amplifier (14) having a first input connected to the output of said AND gate (11) and a second input coupled to the output of said delay circuit (13), the output of said differential amplifier comprising the output signal of said decoder.

6. The decoder in accordance with claim 5, characterized in that the clock regeneration circuit comprises a transistor amplifier loaded by a L-C oscillatory circuit of high Q-factor, tuned to the clock frequency and followed by a square-wave shaping amplifier.

7. The decoder in accordance with claim 5, characterized in that the delay circuit comprises:

a D-type flip-flop (15) having a data input, a clock input and an output and connected via its data input to the output (K) of the logic "nand" gate (12) and via its clock input to the output ($\overline{H}$) of the clock regeneration circuit, the said D-type flip-flop (15) being triggered by the 0 to 1 transitions of its clock signal and a logic "and" gate (16) with two inputs, one connected to the output (L) of the D-type flip-flop (15), the other connected to the output ($\overline{H}$) of the clock regeneration circuit.

8. A regenerator for receiving a signal to be regenerated and providing a regenerator output signal, said signal to be regenerated representing a series of binary data digits having first and second values, said series including at least first and second sequences of (n+1) successive binary digits of said second value, said first sequence preceding said second sequence and each of said sequences having first and last digits, m digits of said first value occurring in said series between said first and second sequences, where m is a non-negative integer, said signal to be regenerated comprising a series of first and second elementary signals each having at least one of first and second levels and occupying a time interval known as the binary interval, said first elementary signals having only one of said first and second levels for the duration of said binary interval and said second elementary signals having said first level during the first half of said binary interval and said second level during the second half of said binary interval, said series of first and second elementary signals comprising a first elementary signal for each binary digit of said first value, the level of each first elementary signal representing a digit of said first value being different from the level of the most recent preceding first elementary signal in said signal to be regenerated; a second elementary signal for each binary digit of said second value, except said first and last digits; a first elementary signal for said first digit in said second sequence when m is an even number, the level of said first elementary signal representing said first digit being different from the level of the most recent first elementary signal in said signal to be regenerated; a second elementary signal for said first digit in said second sequence when m is an odd number; and a first elementary signal for said last digit, the level of said first elementary signal representing said last digit being the same as the level of the most recent first elementary signal in said signal to be regenerated, said regenerator comprising:

a clock regeneration circuit providing at its output (H) a regenerated clock signal defining the binary intervals in said signal to be regenerated;

a delay circuit (17) connected to said output of said clock regeneration circuit and providing at its output a delayed version of said regenerated clock signal, said delayed version being delayed by a period less than half of the binary interval at a multiple close to the binary interval;

a first sampling circuit (19) having a first sampling input for receiving the signal to be regenerated, said first sampling circuit having first and second sampling control inputs connected to the outputs (H and $H_1$) of said clock regeneration circuit and of said delay circuit, said first sampling circuit sampling said signal to be regenerated during a short period (X) in the first half of each binary interval following a transition of said delayed version of the regenerated clock signal;

a second sampling circuit (20) with a sampling input receiving a complementary version of said signal to be regenerated, said second sampling circuit being connected via sampling control inputs to the outputs (H and $H_1$) of said clock regeneration circuit and said delay circuit, said second sampling circuit sampling said complementary version of said signal to be regenerated during a short period (Z) in the first and second halves of each binary interval following transitions of said delayed version of said regenerated clock signal; and a bistable flip-flop (21) having a reset-to-one input connected to the output (P) of said first sampling circuit (19) and a reset-to-zero input connected to the output (0) of said second sampling circuit (20), the output of said bistable flip-flop comprising said regenerator output signal.

9. The regenerator in accordance with claim 8, in which the regenerated clock signal delivered by the clock regenerator circuit exhibits 0 to 1 transitions at the start of the binary intervals of the signal to be regenerated, characterized in that the first sampling circuit (19) is a logic "and" circuit with its inputs fed with the signal to be regenerated, the regenerated clock signal and its delayed version and delivering a command signal (P) for resetting the bistable flip-flop (21) to one only when the aforementioned first sampling circuit input signals are simultaneously at logic level 1, and also characterized in that the second sampling circuit (20) is a logic circuit with its inputs fed with a complementary version of the signal to be regenerated, the regenerated clock signal and its delayed version and delivering a command signal (0) for resetting the bistable flip-flop (21) to zero only when the signal to be regenerated is at logic level 0 and when the regenerated clock signal and its delayed version are simutaneously at the same logic level.

10. An error detector for receiving and detecting errors in a binary digital signal, said binary digital signal representing a series of binary data digits having first and second values, said series including at least first and second sequences of (n+1) successive binary digits of said second value, said first sequence preceding said second sequence and each of said sequences having first and last digits, m digits of said first value occurring in said series between said first and second sequences, where m is a non-negative integer, said binary digital signal comprising a series of first and second elementary signals each having at least one of first and second levels and occupying a time interval known as the binary interval, said first elementary signals having only one of said first and second levels for the duration of said binary interval and said second elementary signals having said first level during the first half of said binary interval and said second level during the second half of said binary interval, said series of first and second elementary signals comprising a first elementary signal for each binary digit of said first value, the level of each first elementary signal representing a digit of said first value being different from the level of the most recent preceding first elementary signal and said binary digital signal; a second elementary signal for each binary digit of said second value, except said first and last digits; a first elementary signal for said first digit in said second sequence when m is an even number, the level of said first elementary signal representing said first digit being different from the level of the most recent first elementary signal in said binary digital signal; a second elementary signal for said first digit in said second sequence when m is an odd number; and a first elementary signal for said last digit, the level of said first elementary signal representing said last digit being the same as the level of the most recent first elementary signal in said binary digital signal, said error detector comprising:

a clock regeneration circuit delivering a regenerated and inverted clock signal (H) defining the binary intervals in said binary digital signal and having trailing edges coincident with the leading edges in said binary digital signal;

a logic AND gate (39) having a first input receiving said binary digital signal and a second input receiving said regenerated and inverted clock signal;

a logic NOR gate (40) having first and second inputs coupled to the first and second inputs, respectively, of said AND gate (39);

a delay circuit (41) receiving the said regenerated and inverted clock signal and the output of said NOR gate (40) and delaying the output of said NOR gate by one-half of a binary interval;

a frequency doubler (42) receiving and frequency doubling said regenerated and inverted clock signal;

a bidirectional, four-stage (ABCD) shift-register (43) having a clock input coupled to the output of said frequency doubler, a logic 1 signal level applied to parallel data inputs for stages A and B and to a right-shift serial data input, a logic 0 signal level applied to parallel data inputs for stages C and D and to a left-shift serial data input, a right-shift control input triggered by the output of said AND gate (39), and a left-shift control input triggered by the signal at the output of said delay circuit (41); and a logic circuit (44) for providing an error signal as the output of said error detector in response to a right or left overflow in said shift-register or in response to two shifts in the same direction within said shift register, said error signal resetting said shift register to its initial state.

* * * * *